(12) United States Patent
Löhken et al.

(10) Patent No.: US 11,278,993 B2
(45) Date of Patent: Mar. 22, 2022

(54) METHOD FOR PRODUCING A PISTON AND PISTON

(71) Applicant: STABILUS GMBH, Koblenz (DE)

(72) Inventors: Lars Löhken, Linz am Rhein (DE); Markus Müller, Koblenz (DE); Raphael Piroth, Koblenz (DE); Ulrich Probst, Hilscheid (DE)

(73) Assignee: STABILUS GMBH, Koblenz (DE)

( * ) Notice: Subject to any disclaimer, the term of this patent is extended or adjusted under 35 U.S.C. 154(b) by 0 days.

(21) Appl. No.: 17/058,154

(22) PCT Filed: May 22, 2019

(86) PCT No.: PCT/EP2019/000161
§ 371 (c)(1),
(2) Date: Nov. 24, 2020

(87) PCT Pub. No.: WO2019/223899
PCT Pub. Date: Nov. 28, 2019

(65) Prior Publication Data
US 2021/0197326 A1    Jul. 1, 2021

(30) Foreign Application Priority Data
May 24, 2018   (DE) ..................... 10 2018 112 458.9

(51) Int. Cl.
*B23P 15/10*    (2006.01)
*F16F 9/32*    (2006.01)
*F16F 9/34*    (2006.01)

(52) U.S. Cl.
CPC ............ *B23P 15/10* (2013.01); *F16F 9/3214* (2013.01); *F16F 9/3271* (2013.01); *F16F 9/3405* (2013.01);
(Continued)

(58) Field of Classification Search
CPC ... B23P 15/10; F16F 9/3214; F16F 2226/026; F16F 2226/04; F16F 9/3405; F16F 2226/02; F16F 9/3271
See application file for complete search history.

(56) References Cited

U.S. PATENT DOCUMENTS

| | | | |
|---|---|---|---|
| 6,018,868 A * | 2/2000 | Asadi | B23P 15/10 29/557 |
| 9,021,695 B2 * | 5/2015 | Keller | B21K 1/185 29/888.04 |
| 2009/0282885 A1* | 11/2009 | Ooka | B21K 1/32 72/256 |

FOREIGN PATENT DOCUMENTS

| | | |
|---|---|---|
| DE | 19615584 A1 | 6/1997 |
| DE | 19735249 C1 | 3/1999 |

(Continued)

OTHER PUBLICATIONS

International Search Report for PCT/EP2019/000161 dated Feb. 24, 2020.

*Primary Examiner* — Ryan J. Walters
(74) *Attorney, Agent, or Firm* — Schmeiser, Olsen & Watts, LLP

(57) ABSTRACT

A piston and a method for producing a piston which can be secured to a piston sliding unit is provided. The piston sliding unit can be moved along its longitudinal axis in a cylinder. The piston includes a disc-shaped base body, wherein the piston is suitable and intended to seal two regions of the cylinder filled with a medium against one another. The method includes the following steps: a) producing the piston by pressing a material into a piston mold; b) smoothing the surface of the piston and/or pressing at least one flow path into the piston, by an embossing tool, which has a raised and rotationally symmetrical structure.

4 Claims, 5 Drawing Sheets

(52) U.S. Cl.
CPC ..... *F16F 2226/02* (2013.01); *F16F 2226/026* (2013.01); *F16F 2226/04* (2013.01)

(56) References Cited

FOREIGN PATENT DOCUMENTS

| | | | |
|---|---|---|---|
| EP | 2951458 | A1 | 12/2015 |
| WO | 2014117765 | A1 | 8/2014 |

\* cited by examiner

METHOD FOR PRODUCING A PISTON AND PISTON

CROSS-REFERENCE TO RELATED APPLICATIONS

This application claims priority to PCT Application No. PCT/EP2019/000161, having a filing date of May 22, 2019, based on German Application No. 10 2018 112 458.9, having a filing date of May 24, 2018, the entire contents both of which are hereby incorporated by reference.

FIELD OF TECHNOLOGY

The following relates to a method for producing a piston as well as a piston attachable to a piston sliding unit which is movable along its longitudinal axis in a cylinder, wherein the piston has a disc-shaped base body, wherein the piston being suitable and intended to seal two regions of the cylinder filled with a medium against each other.

BACKGROUND

Dampers, in particular purely progressive dampers, i.e. dampers in which the force to be applied for pushing in and/or pulling out the piston sliding unit into or out of the cylinder increases faster with increasing spring travel than with linear dependence, have pistons with invariable bypasses or flow paths through which the medium flows from one region of the cylinder into another region of the cylinder when the piston sliding unit is pushed into or pulled out of the damping cylinder. Here, the resistance to the flow of the displaced medium increases with the flow velocity, thus creating progressiveness. The dimensioning of the bypasses is of decisive importance for the progressivity and the damping characteristic. These are usually already introduced via the tool, as in the case of sintered or plastic parts, or by machining, as in the case of aluminium pistons. Especially in the case of sintered pistons, these bypasses are usually already formed from the sinterable powder when the piston is pressed.

Machining reaches its limits with particularly small bypasses, in so far as the process-related tolerances become too large in relation to the bypass. Possible reasons for the process-related tolerances are, for example, tool wear, temperature changes on the machine or the set-up accuracy.

When pressing sintered pistons, the same problem exists with regard to the process-related tolerances of the bypasses. When pressing with subsequent sintering of sintered pistons, production tolerances in the region of ISO tolerance 7 (IT 7) up to IT 6 (in favorable cases) can be achieved. However, this is not sufficient, especially for the production of small bypasses. In addition, the pressing process is often followed by surface treatment for deburring the component, for example by vibratory grinding or shot peening, which can negatively influence the tolerances of the bypasses.

SUMMARY

An aspect relates to a method for the production of a piston and a piston, which allow to produce pistons with lower production tolerances in industrial mass production and thus to counteract the problem described above.

An aspect relates to a method for producing a piston which is attachable to a piston sliding unit which is movable along its longitudinal axis in a cylinder. The piston comprises a disc-shaped base body, wherein the piston is suitable and intended to seal two regions of the cylinder filled with a medium against each other. The method for producing a piston according to embodiments of the invention comprises the following steps:

a. Producing the piston by pressing a material into a piston mold;

b. Smoothing the surface of the piston and/or pressing at least one flow path into the piston, by an embossing tool which has a raised and rotationally symmetrical structure.

In a first process step, a material is pressed into a piston mold. The material is for example, metal, such as steel or iron, a ceramic or a sinterable powder, such as a metal powder, for example aluminium or iron powder, or a ceramic powder, such as aluminium oxide or silicon carbide. Furthermore, the use of any other sinterable material in powder form known to the expert is conceivable, or the use of any other metal. In the pressing process the material is pressed into a piston shape. Different pressure distributions on the material are conceivable. For example, the pressing can be uniaxial and/or isostatic. In an embodiment, after the pressing process, the piston produced in this way does not yet have a bypass with a flow path for the medium. However, it is still conceivable that the piston after the pressing process already has a preform of a bypass, or the bypass itself. In an embodiment, the piston is pressed by cold hammering or another cold forming technique known to the expert.

If the previously produced piston consists of a sinterable powder, the piston previously produced in the pressing process is sintered in a subsequent sintering process under the influence of temperature and/or pressure, for example. In this process step, properties such as hardness, strength and thermal conductivity of the piston can be adjusted.

If the previously produced piston consists of a sinterable powder, the previously sintered piston is now deburred after sintering. In an embodiment, this is done by shot peening or vibratory grinding, but other deburring processes known to the specialist are also conceivable.

In the last step of the process, the surface of the piston is smoothed by an embossing tool. For this purpose, the embossing tool is pressed flat against the piston with a defined force and/or a defined amount of the surfaces to be smoothed. Furthermore, the embossing tool may have a raised rotationally symmetrical structure, which is embossed into the piston when the embossing tool is pressed against the piston. This results in a negative impression of the raised rotationally symmetrical structure in the piston surface. The piston is pressure-formed by the embossing tool. However, it is also conceivable that in this process step the surface of the piston is not smoothed by the embossing tool, but that the embossing tool merely embosses the raised rotationally symmetrical structure into the piston. It is also conceivable that the embossing tool only smoothes the surface of the piston. However, in embodiments, both steps may be carried out, smoothing the surface and pressing the flow path into the piston. The particularly smooth surface in the region of the flow path obtained this way allows a particularly homogeneous and controlled flow along the flow path.

The embossing tool may be embodied as a calibration die, but it can also be embodied as any other type of tool known to the expert for forming or smoothing a surface. In an embodiment, calibration dies may be used after the basic shaping of a component, for example to smoothing the surface of the component or to optimize the shaping with regard to a lower production tolerance. However, it is also possible to perform a forming of a component directly with a calibration die. In an embodiment, the calibration die is rotationally symmetrically shaped so that it can be precisely reworked on a regular basis in order to maintain the low production tolerance, for example, in the region from IT 3 to IT 4 (batch scatter) and IT 4 to IT 6 (cross-batch).

According to at least one further embodiment, the raised, rotationally symmetrical structure of the embossing tool has at least one point of intersection with an annular piston collar when it is placed on the piston, which comprises the annular piston collar.

In an embodiment, the piston has an annular piston collar. The piston collar may be embodied as a raised structure on the piston surface. The surface of the piston collar represents a sealing surface which, when pressed against a sealing counter surface, seals two regions of the cylinder filled with a medium against each other. The sealing counter surface is the surface of a sealing element, for example a sealing ring, for example made of metal or plastic. It is conceivable that the sealing element is flexible. It is also conceivable that the sealing element is rotationally symmetric or has non-rotationally symmetric elements, for example for the passage of the medium. The sealing element is arranged on the surface of the piston, which has the annular piston collar. The sealing element can be fixed directly against this surface. A common arrangement of the piston and sealing element at the piston sliding unit is conceivable or also an arrangement where only the piston or the sealing element is arranged at the piston sliding unit. Furthermore, it is conceivable that the sealing element is arranged floating on the piston and is only pressed against the surface of the piston when the piston sliding unit is actuated axially in a certain direction (into the cylinder or out of the cylinder) by a pressure difference between the two regions of the cylinder.

When the embossing tool is placed on the piston surface, the embossing tool is arranged relative to the piston in such a way that the raised rotationally symmetrical structure of the embossing tool and the annular piston collar of the piston come to rest on each other at at least one point and have at least one point of intersection. At the point of intersection the rotationally symmetrical structure of the embossing tool thereby crosses the piston collar from the side facing the piston center, i.e. the inside of the piston collar to the side facing away from the piston center, i.e. the outside of the piston collar, or from the side of the piston collar facing away from the piston center to the side of the piston collar facing the piston center.

The embossing tool is now pressed against the piston in the previously described arrangement to the piston or the piston is pressed against the embossing tool, whereby the contact pressure and/or the defined amount can be precisely adjusted in both cases. The contact pressure and/or the amount is selected depending on various parameters, e.g. according to the strength, elasticity and plasticity of the materials used or their specific yield point or the process temperature, so that the piston is specifically plastically deformable by pressing the embossing tool against it. Furthermore, it is also conceivable that the contact pressure and/or the defined amount are selected in dependence on other parameters known to the expert.

In accordance with at least one further embodiment, by pressing the raised, rotationally symmetrical structure of the embossing tool into the piston at at least one point of intersection of the raised, rotationally symmetrical structure of the embossing tool with the annular piston collar, the annular piston collar is at least partially pressure-formed into a flattened and/or recessed shape.

During the pressing process, the raised, rotationally symmetrical structure of the embossing tool and the annular piston collar are now pressed against each other at least at the at least one point of intersection. In the process, the raised rotationally symmetrical structure of the embossing tool presses the annular piston collar into a flatter shaped at least at the at least one point of intersection or in at least one intersection area, so that the annular piston collar is pressure-formed into a flatter shape at least at this point. The annular piston collar is thus flattened at at least one point by the raised rotationally symmetrical structure of the embossing tool. This implies that the height of the piston collar, relative to the direction perpendicular to the plane defined by the disc-shaped base body and parallel to the piston sliding unit (if the piston is arranged on the piston sliding unit) is reduced at the flattened point. The point of intersection or the area of intersection is defined by the contact surface between rotationally symmetrical structure and piston collar. The piston collar is flattened on the entire contact surface of the rotationally symmetrical structure and the piston collar.

Due to this flattening of the annular piston collar, the surface of the piston collar no longer lies against the sealing counter surface in the region of the flattening when it is arranged on a sealing element. At the point of intersection, where the flattening of the piston collar extends from the side of the piston collar facing the piston center to the side of the piston collar facing away from the piston center, the surface of the piston collar thus does not lie at all against the sealing counter surface of the sealing element, which creates a flow path for the medium from one of the two regions of the cylinder filled with a medium, which are sealed against each other by the piston, to the other region. This flow path represents the bypass described above, which determines the damper characteristic curve of the damper. The reduction in height of the piston collar at the at least one flattened point is so high that a bypass is created through which the medium can flow along the flow path.

By producing the bypass with an embossing tool, in particular with a calibration die, a reduced production tolerance in the region from IT 3 to IT 4 (batch scattering) and IT 4 to IT 6 (cross-batch) can be achieved and thus a piston can be produced in industrial series production in accordance with embodiments of the invention.

In accordance with at least one further embodiment, the annular piston collar has at least one meander-shaped convexity and/or concavity, which for example, has at least one section oriented radially and one oriented tangentially to the piston.

The annular piston collar may have at least one meander-shaped convexity or concavity and/or at least one change of direction. In the case of a meander-shaped concavity, the annular piston collar does not run completely circularly on the surface of the piston, but describes at the beginning of the concavity a first curve in the direction of the center of the piston surface on which the piston collar is arranged with an adjoining straight section and thus has a piston collar section which is arranged radially in relation to the disc-shaped base body of the piston.

In the further course of the concavity, in an embodiment, the piston collar has a second curve in the opposite direction, also with an adjoining straight section and thus has a piston collar section which is arranged tangentially with respect to the disc-shaped base body of the piston. Following this, the piston collar may have a third curve in the same direction as the second curve which is also followed by a straight section. The concavity thus has a second piston collar section, which is arranged radially in relation to the disc-shaped base body of the piston. This second radial section is followed by a fourth curve, which runs in the same direction as the first curve, so that the piston collar now continues to run along the circular basic shape. In the case of a convexity, the piston collar is shaped similar to this description, with the difference that the curves lead in the other direction or that the first radial section of the piston collar leads away from the center of the piston surface on which the piston collar is located. Furthermore, it is conceivable that the piston collar has corners in the region of the concavity or convexity instead of curves.

In an embodiment, the concavity or convexity described above has an angular "U" shape with or without rounded corners. However, other shapes of concavities or convexities are conceivable, for example a "V" shape or a semi-circular shape, or any other shape known to the expert with which the raised rotationally symmetrical structure of the embossing tool intersects the piston collar at at least one point.

According to at least one further embodiment, at least one point of intersection of the rotationally symmetrical structure of the embossing tool is located within at least one meander-shaped concavity or convexity of the annular piston collar.

According to at least one further embodiment, at least one point of intersection of the rotationally symmetrical structure of the embossing tool is arranged in the at least one section of the at least one meander-shaped convexity or concavity of the annular piston collar which is aligned radially to the piston.

In an embodiment, the piston collar has one or more meander-shaped concavities. The meander-shaped concavities may have rectangular corners, which can be rounded. In an embodiment, the raised rotationally symmetrical structure of the embossing tool is ring-shaped. It is particularly advantageous if the ring diameter of the raised rotationally symmetrical structure is smaller than the ring diameter of the piston collar without the meander-shaped concavities, but larger than the ring diameter of an imaginary ring along the tangentially running sections of the concavities of the piston collar. Thus, at each concavity there are two points of intersection of the raised rotationally symmetrical structure of the embossing tool and the piston collar, each in the radially arranged sections of the piston collar of a concavity. It is particularly advantageous if the ring diameter of the raised rotationally symmetrical structure of the embossing tool is smaller than the ring diameter of the piston collar, but still large enough to ensure that the raised rotationally symmetrical structure of the embossing tool is on its outside, with respect to the ring center, along the entire ring circumference but outside the concavities, with a portion of the ring width resting on a portion of the ring width on the inside, with respect to the ring center, of the piston collar and also pressure forming it into a flatter shape.

In the case of meander-shaped convexities of the piston collar, the ring diameter of the raised rotationally symmetrical structure is advantageously larger than the ring diameter of the piston collar without the meander-shaped convexities, but smaller than the ring diameter of an imaginary ring along the tangentially running sections of the convexities of the piston collar. This means that there are also two points of intersection of the raised rotationally symmetrical structure of the embossing tool and the piston collar at each convexity, each in the radially arranged sections of the piston collar of a convexity.

Embodiments of the invention further provide a piston of a hydraulic or pneumatic damper, which can be arranged on a piston sliding unit. The piston sliding unit is movable along its longitudinal axis in a cylinder and the piston comprises a disc-shaped base body, wherein the piston is suitable and intended to seal two regions of the cylinder filled with a medium against each other.

Embodiments of the invention are characterized in that the piston comprises an annular piston collar having at least one outer wall and at least one inner wall, the at least one inner wall being radially spaced from the at least one outer wall, the at least one inner wall and the at least one outer wall having segment-like recesses and the recesses of the at least one inner wall and the recesses of the at least one outer wall being arranged offset with respect to one another along the circumference of the piston, so that the recesses and the intermediate space between the at least one inner and at least one outer wall is traversable by the medium.

It is conceivable that the damper is embodied as a hydraulic or as a pneumatic damper (for example as a gas spring), in monotube or twin-tube design, or in any other damper design known to the expert. The damper comprises at least one cylinder, one piston, one piston sliding unit, one sealing element and one medium. The medium is located in the cylinder. The piston is arranged at one end of the piston sliding unit. The sealing element is also arranged at this end. The piston sliding unit is at least partially arranged in the cylinder and thus in the medium, but at least with the end to which the piston is attached. The piston separates two regions of the cylinder filled with the medium from each other. The piston sliding unit and the piston attached to it can be moved along the longitudinal axis of the piston sliding unit in the cylinder. In an embodiment, the medium is an oil or gas. If the medium is an oil, the cylinder may not completely filled with the oil and the remaining volume is filled with a gas.

The piston has a disc-shaped base body with a diameter smaller than the inner diameter of the cylinder. Furthermore, the piston has a thickness in the direction of the piston sliding unit longitudinal axis. However, other shapes of the piston are also conceivable. Furthermore, the piston comprises a piston collar on the upper or lower side. In an embodiment, the piston collar is embodied as an annular piston collar with a raised structure. The piston collar may have a flat surface parallel to the surface of the disc-shaped base body. In an embodiment this surface is arranged on a sealing counter surface of the sealing element. The piston collar thus seals the two regions of the cylinder, which are separated from each other by the piston, against each other. One region is fluidically connected to the region on the inside (with respect to the ring center of the annular piston collar) of the piston collar and the other region is fluidically connected to the region on the outside of the piston collar.

The piston collar may be annular. The piston collar may comprises an inner and an outer wall. The inner and outer walls each have a certain wall thickness (also called ring width). The outer as well as the inner wall have recesses along the circumference of the piston collar. In an embodiment, the piston collar is interrupted at these recesses. Thus, there is no piston collar at these points, but only the disc-shaped base body. Furthermore, it is conceivable that the piston collar is not completely interrupted at the recesses, but is only flattened or shaped in such a way that the surface of the piston collar does not reach the sealing counter surface. The recesses of the outer and inner walls are for example, offset from each other. This means that at the position of the piston collar in relation to the circumference where the outer wall has a recess, the inner wall has no recess and vice versa. In other words, the piston has at least one or at least two walls in each radial direction from the piston center to the piston rim.

Furthermore, it is advantageous if between the points of a recess in the outer wall and a recess in the inner wall there is a region of the piston collar in relation to the circumference in which neither the inner nor the outer wall has a recess. In this region there is an overlap of the walls in relation to the circumference of the piston collar. It is conceivable that in the region of the overlap the intermediate space between the walls is at least partially filled with a piston collar that has been formed into a flattened shape. It is also conceivable that the recesses have a greater extension in relation to the circumference than the wall itself. In the present embodiment, the recesses of the outer wall are, for example, small in relation to the circumference. In the present embodiment, the recesses of the inner wall may be large in relation to the circumference. In particular, it is advantageous if the recesses of the inner wall have a larger extension in relation to the circumference of the piston collar than the inner wall itself. Furthermore, it is conceivable that the recesses of the outer wall have a larger extension than the outer wall itself in relation to the circumference of the piston collar and the recesses of the inner wall are small in relation to the circumference. It is also conceivable that the piston collar has more than two walls. It is also conceivable that the piston collar has more than two walls, with all walls having recesses which are offset in relation to the circumference of the piston collar or not offset in relation to each other or at least partially offset in relation to each other.

According to at least one further embodiment, the recesses, and the intermediate space between the at least one inner and at least one outer wall of the piston collar are traversable by a medium and thus define a flow path for the medium.

The previously described, offset recesses thus create a flow path from the inside of the annular piston collar to a region outside the annular piston collar. The piston collar no longer completely seals the two regions of the cylinder, which are separated from each other by the piston, but connects both regions with the help of the flow path. This flow path may be small compared to the diameter of the cylinder in terms of the channel cross section. In an embodiment, the channel cross-section is adjustable by the space portion of the piston collar, which is formed into a flattened shape, in the intermediate space between the walls. The channel cross section may thus be adjustable by the height of the raised rotationally symmetrical structure of the embossing tool, which determines the height of the formed piston collar. It is therefore conceivable to emboss a different channel cross section into the piston by exchanging the embossing tool for an embossing tool with a raised rotationally symmetrical structure which has a different height. It is also conceivable that the height of the raised rotationally symmetrical structure can be changed. Thus, different channel cross sections can be formed with one tool.

The flow path thus represents the bypass of the damper described at the beginning. The flow path cross section thus causes the progressivity of the damper characteristic curve. When the piston sliding unit is actuated axially with the piston attached, the piston is moved along the longitudinal axis of the piston sliding unit in the cylinder. The medium flows through at least one flow path in the piston collar of the piston from one region to the other region of the cylinder.

According to at least one other embodiment, the flow path of the medium has at least one curved section.

Known pistons often have bypasses with radial orientation. This means that the bypasses are traversable by the medium along a straight line in a radial direction with respect to the disc-shaped base body of the piston. In these cases, the piston collar often has only one wall with recesses. The recesses directly represent the bypasses and the medium flows in a straight line in a radial direction from one region of the cylinder, which is fluidically connected to the region on the inside of the annular piston collar, into the other region of the cylinder, which is connected to the region on the outside of the annular piston collar, or vice versa. In contrast, the piston of embodiments of the invention may have a flow path which has at least one curved section. This means that the medium does not flow straight through the bypass along the flow path, but flows around at least one curve. In an embodiment, the flow path with the curved section is arranged in the plane parallel to the surface of the disc-shaped base body of the piston. The flow path in the curved section may describe a curve of at least 60, 70 or 80 and at most 100, 110 or 120 degrees, or in an embodiment, 90 degrees. However, any other angle value which is not 0 degrees is also conceivable.

According to at least one other embodiment, the flow path of the medium is labyrinthiform.

In the context of embodiments of the present invention, labyrinthiform means that the flow path has at least one, or two, or even more than two deflections. In particular, when looking into a labyrinthiform (flow) path, the outlet or exit is not visible from the inlet or entrance. The deflections refer to a section in which the flow of the medium is deflected from a straight flow direction by the border of the flow path. In an embodiment, the deflections represent the previously described curved sections.

According to at least one further embodiment, the direction of flow of the medium in at least one inlet and/or outlet point of at least one flow path or any point along at least one flow path is tangential with respect to the piston.

As described above, known pistons often have bypasses with radial orientation. This means that the medium can flow through the bypasses in radial direction. In contrast, the piston according to embodiments of the invention may have at least one point, or in an embodiment, a region along at least one flow path, in which the direction of flow is tangential, i.e. parallel to the circumference of the annular piston collar. In an embodiment, this point or region is located directly at the entry and/or exit point of the at least one flow path. In an embodiment, this tangential region of the flow path is limited by the inner and outer wall of the annular piston collar.

The tangential region of the flow path may therefore be located in a region in which neither the inner nor the outer wall has a recess. The tangential region of the flow path may therefore be located in an area where the walls overlap in relation to the circumference of the piston collar. In an embodiment, the flow of the medium during axial actuation of the piston sliding unit with the piston arranged thereon runs radially outwards (in relation to the disc-shaped base body of the piston) until the medium meets the piston collar. At the piston collar the medium enters the flow path through at least one bypass. The piston may have three bypasses. The medium flows around a region of the cylinder, which is fluidically connected to a region on the inside of the annular piston collar, a segment of the inner wall through the circumferential left and right recesses of the inner wall. Directly adjacent to this, the flow path has a tangential section which runs between the inner and outer wall, i.e. in the overlapping region of the walls. The flow path thus has a curved section directly at the inlet of the flow path, in which the medium changes the direction of flow from radial to tangential (relative to the disc-shaped base body of the piston).

Adjacent to the region with tangential flow direction is another curved section of the flow path in which the medium changes the flow direction from tangential to radial (with respect to the disc-shaped base body of the piston). The flow path then runs radially through a recess in the outer wall out of the annular piston collar. The medium thus flows out of the recess in the outer wall into the other region of the cylinder, which is fluidically connected to a region on the outside of the annular piston collar.

According to at least one other embodiment, at least two pistons (1) are arranged in the damper on the piston sliding unit (2).

As already described above, it is possible to arrange the sealing element floating on the piston. In this case, the sealing element is pressed against the piston by the pressure difference between the two regions of the cylinder when the damper is actuated in one (forward) direction and the medium can only flow from one region to the other region of the cylinder through the flow path. When the damper is actuated in the other (backward) direction, the sealing element is pressed away from the piston due to the pressure difference that now exists the other way round. In this case, the medium can flow back into the first region through a much larger flow cross-section. The damper can thus be operated much more easily in this second (backward) direction than in the first (forward) direction. It is conceivable that the piston and the floating sealing element are arranged the other way round on the piston sliding unit so that the first (forward) direction is easier to operate than the second (backward) direction. Furthermore, it is also conceivable that two pistons and one or more floating sealing elements are arranged on the piston sliding unit. In this case, the pistons may be arranged with the side on which a flow path has been impressed facing each other. In an embodiment, on the side on which a flow path has been impressed, one sealing element is arranged floating, whereby one floating sealing element may be sufficient for two pistons arranged with a flow path facing each other. In this way, the damping behavior of the forward direction corresponds to that of the backward direction. Here it is also conceivable that the two pistons do not have the same flow cross-section. In this case, the damping behavior of the forward and backward direction is different and, in particular, can be adapted to different requirements by selecting the flow cross sections. In this case, the damping behavior of the forward direction and backward direction can be adjusted completely freely from each other.

BRIEF DESCRIPTION

Some of the embodiments will be described in detail, with reference to the following figures, wherein like designations denote like members, wherein:

FIG. 3a);

FIG. 4).

DETAILED DESCRIPTION

Figure 1:
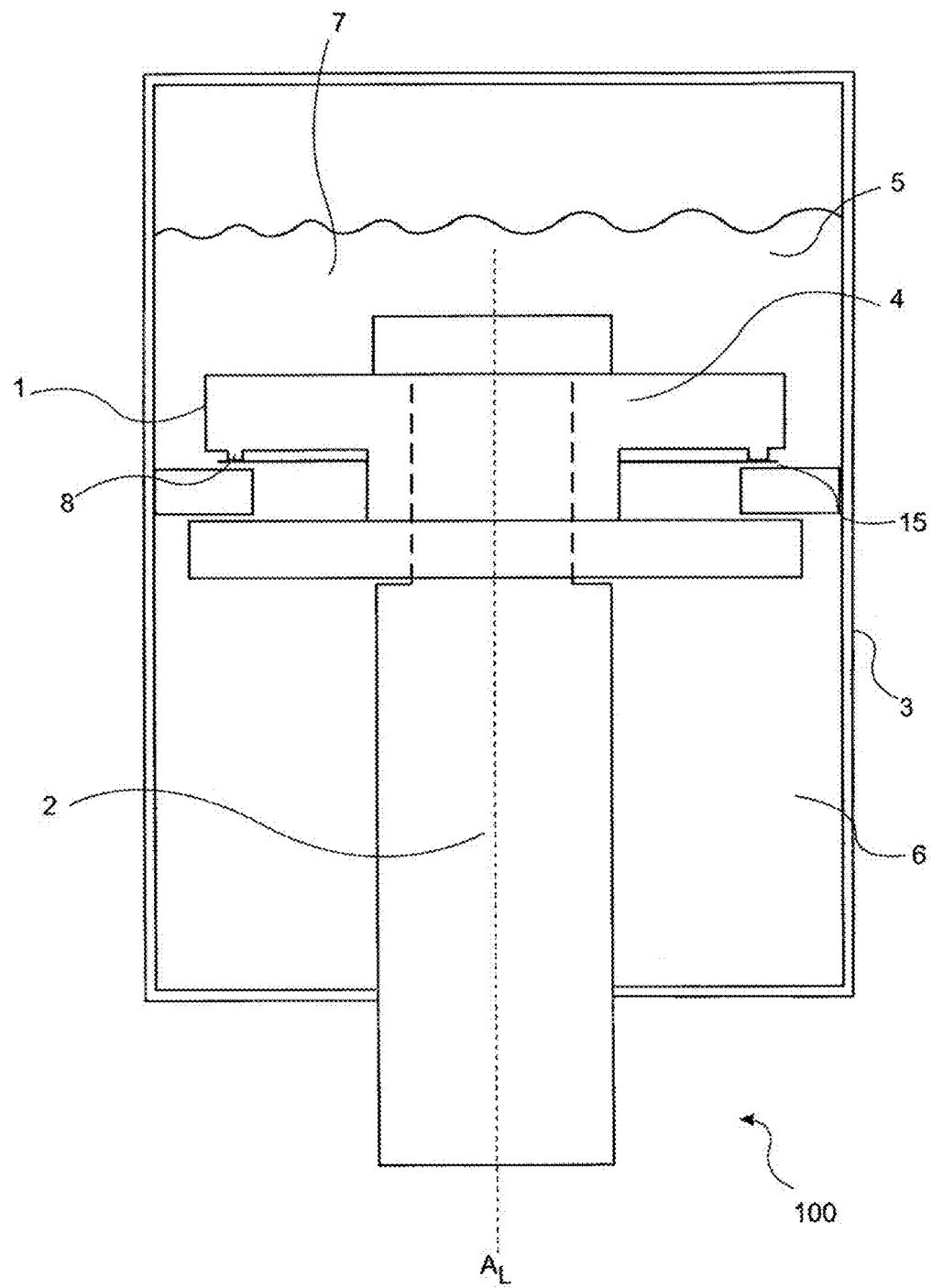
FIG. 1 shows an overview of the piston according to embodiments of the invention arranged in a damper in a preferred embodiment.

In the FIG. 1 a piston 1 of a hydraulic or pneumatic damper 100 is schematically shown, which can be mounted on a piston sliding unit 2. The piston sliding unit is movable along its longitudinal axis $A_L$ in a cylinder 3 and the piston 1 comprises a disc-shaped base body 4, whereby the piston 1 is suitable and intended to seal two regions 5, 6 of the cylinder 3 filled with a medium 7 against each other.

Figure 2:
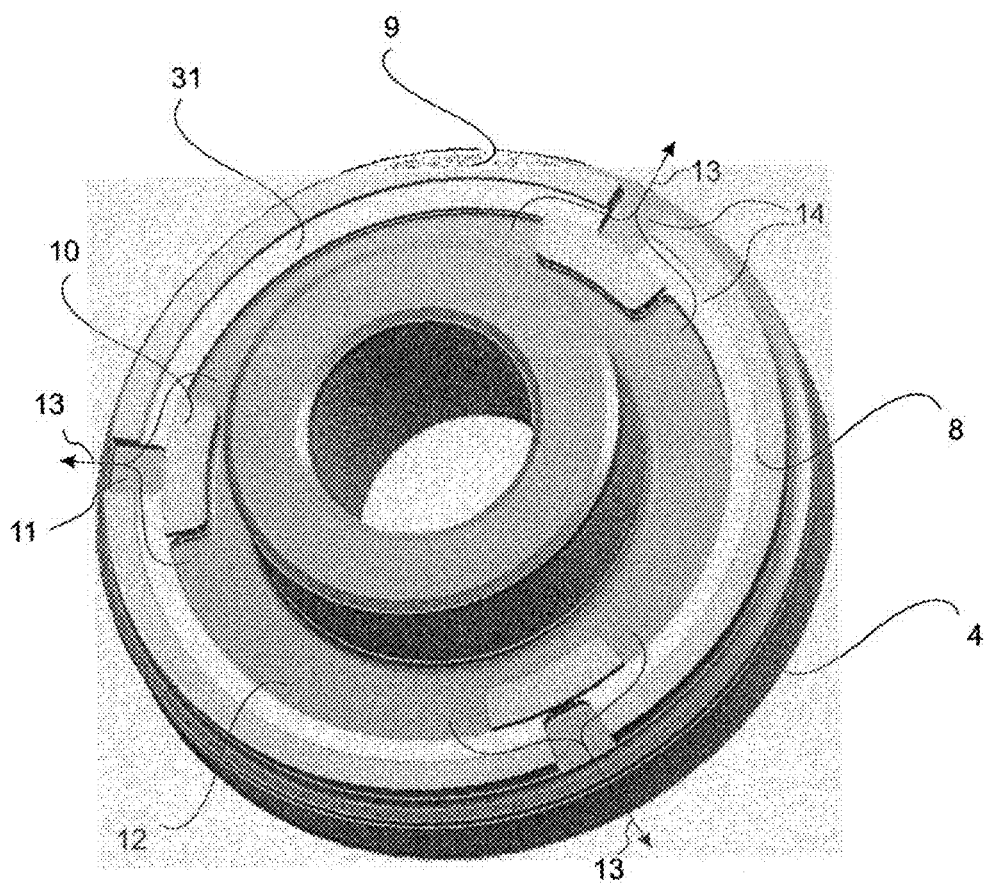
FIG. 2 shows a perspective representation of the piston in embodiments of the invention.

Embodiments of the invention are characterized in that the piston 1 comprises an annular piston collar 8, which has at least one outer wall 9 and at least one inner wall 10 and the at least one inner wall 10 is radially spaced from the at least one outer wall 9, the at least one inner wall 10 and the at least one outer wall 9 having segment-like recesses 11, 12 and the recesses of the at least one inner wall 10 and the recesses of the at least one outer wall 9 are arranged offset from one another along the circumference of the piston 1 so that the recesses 11, 12 and the intermediate space between the at least one inner and at least one outer wall 9, 10 is traversable by the medium 7 (not in FIG. 1, see FIG. 2).

The damper 100 comprises at least one cylinder 3, a piston 1, a piston sliding unit 2, a sealing element 15 and a medium 7. The medium 7 is located in the cylinder 3. The piston 1 may be located at one end of the piston sliding unit 2. The sealing element 15 is also located at this end. The piston sliding unit 2 is at least partially located in the cylinder 3 and thus in the medium 7, but at least with the end to which piston 1 is attached. The piston 1 separates two regions 5, 6 of cylinder 3 filled with the medium 7 from each other. The piston sliding unit 2 and the piston 1 attached to it can be moved along the piston sliding unit longitudinal axis $A_L$ in cylinder 3. In an embodiment, the cylinder 3 is not completely filled with medium 7, e.g. an oil, and the remaining volume is filled with a gas.

The piston 1 has a disc-shaped base body 4 whose diameter is smaller than the inner diameter of the cylinder 3. The piston 1 also has a thickness in the direction of the piston sliding unit longitudinal axis $A_L$. In addition, the piston 1 has a piston collar 8 on the upper and/or lower side. The piston collar 8 may be embodied as an annular piston collar raised structure. In an embodiment, the piston collar 8 has a flat surface parallel to the surface of the disc-shaped base body. This surface is for example, arranged on a sealing counter surface of the sealing element 15. The piston collar thus seals the two regions of the cylinder, which are separated by the piston, against each other. One region is fluidically connected to the region on the inside (with respect to the ring center of the annular piston collar) of the piston collar and the other region is fluidically connected to the region on the outside of the piston collar.

FIG. 2 shows a perspective view of the piston 1. The piston collar 8 is, for example, annular. The piston collar 8 may have an inner 10 and an outer wall 9, the inner 10 and the outer wall 9 each having a certain wall thickness (also called ring width). The outer 9 and the inner wall 10 have recesses 11, 12 along the circumference of the piston collar 8. In an embodiment, the piston collar 8 is interrupted at these recesses 11, 12. It is also conceivable that the piston collar 8 is not completely interrupted at the recesses 11, 12, but is only flattened or shaped in such a way that the surface of the piston collar 8 does not reach the sealing counter surface of the sealing element 15. The recesses 11, 12 of the outer 9 and inner wall 10 are, for example, arranged offset to each other.

This means that at the point on the piston collar 8 in relation to the circumference where the outer wall 9 has a recess 11, the inner wall 10 has no recess 12 and vice versa. Furthermore, it is advantageous if, between the points of a recess 11 in the outer wall 9 and a recess 12 in the inner wall 10, a region of the piston collar 8 in relation to the circumference is arranged in which neither the inner 10 nor the outer wall 9 has a recess 11, 12. In this region, the walls 9, 10 overlap in relation to the circumference of the piston collar 8. It is also conceivable that the recesses 11, 12 have a greater extension in relation to the circumference than the walls 9, 10 themselves. In the present embodiment, the recesses 11 of the outer wall 9 are small in relation to the circumference. In the present embodiment, the recesses 12 of the inner wall 10 are for example, large in relation to the circumference. In particular, it is advantageous if the recesses 12 of the inner wall 10 have a larger extension in relation to the circumference of the piston collar 8 than the inner wall 10 itself. It is, however, also conceivable that the recesses 11 of the outer wall 9 have a greater extension than the outer wall 9 itself in relation to the circumference of the piston collar 8 and the recesses 12 of the inner wall 10 are small in relation to the circumference. It is also conceivable that the piston collar 8 has more than two walls. It is also conceivable that the piston collar 8 has more than two walls. It is also conceivable that all walls have recesses which are offset in relation to the circumference of the piston collar or not offset in relation to each other or at least partially offset in relation to each other.

In an embodiment, the recesses 11, 12 and the intermediate space between the at least one inner and at least one outer wall 9, 10 of the piston collar 8 is traversable by a medium 7 and thus define a flow path 13 of the medium 7. The previously described, offset recesses 11, 12 thus create a flow path 13 from the inside of the annular piston collar 8 to a region outside the annular piston collar 8. The piston collar 8 no longer completely seals the two regions of the cylinder 5, 6, which are separated from each other by the piston, but connects both regions with the aid of the flow path 13. This flow path 13 may be small in terms of the channel cross-section compared to the diameter of the cylinder 3. This flow path 13 thus represents the bypass of the damper 100 described at the beginning. The flow path cross-section thus determines the progressivity of the damper characteristic curve. When the piston sliding unit 2 is actuated axially with piston 1 attached, the piston 1 is moved along the longitudinal axis $A_L$ of the piston sliding unit 2 in cylinder 3. The medium 7 flows through at least one flow path 13 in the piston collar 8 of the piston 1 from one region 5 to the other region 6 of the cylinder, or vice versa.

The flow path 13 of the medium 7 has for example, at least one curved section 14. This means that the medium 7 does not flow through the bypass along the flow path 13 in a straight line, but flows around at least one curve. In an embodiment, the flow path 13 with the curved section 14 is arranged in the plane parallel to the surface of the disc-shaped base body 4 of the piston 1. The flow path 13 in the curved section 14 describes for example, a curve of 90 degrees.

The flow path 13 of the medium 7 is may be labyrinthiform. In the context of embodiments of the present invention, labyrinthiform means that the flow path 13 has at least one, or two, or even more than two deflections. In particular, when looking into a labyrinthiform (flow) path, the outlet or exit is not visible from the inlet or entrance. The deflections refer to a section in which the flow of the medium 7 is deflected from a straight flow direction by the boundary of the flow path 13. In an embodiment, the deflections represent the previously described curved sections 14.

In an embodiment, the direction of flow of the medium 7 is tangential with respect to the piston 1 in at least one entry and/or exit point of at least one flow path 13 or any point along at least one flow path 13. The piston 1 according to embodiments of the invention has at least one point, and in an embodiment, a region along at least one flow path 13, in which the direction of flow is tangential, i.e. parallel to the circumference of the annular piston collar 8. In an embodiment, this point or region is located directly at the entry and/or exit point of the at least one flow path 13. This tangential region of the flow path 13 is for example, bounded by the inner 10 and outer wall 9 of the annular piston collar 8. The tangential region of the flow path 13 may therefore be located in a region in which neither the inner 10 nor the outer wall 9 has a recess 11, 12. The tangential region of the flow path 13 may therefore be located in a region in which the walls 9, 10 overlap in relation to the circumference of the piston collar 8. The flow of the medium 7 during axial actuation of the piston sliding unit 2 with piston 1 arranged thereon may runs radially outwards (in relation to the disc-shaped base body 4 of the piston 1) until the medium 7 meets the piston collar 8. At the piston collar 8 the medium 7 enters the flow path 13 through at least one bypass. The piston 1 may have two or three bypasses. The medium 7 comes from a region 6 of the cylinder 3, which is fluidically connected to a region on the inside of the annular piston collar 8, flows around a segment of the inner wall 10 through the circumferential left and right recesses 12 of the inner wall 10. Directly adjacent to this, the flow path 13 has a tangential section which runs between the inner 10 and outer wall 9, i.e. in the overlapping region of the walls 9, 10. The flow path 13 thus has a curved section 14 directly at the inlet of the flow path 13, in which the medium 7 changes the direction of flow from radial to tangential (relative to the disc-shaped base body 4 of the piston 1). Next to this is another curved region 14 of the flow path 13, in which the medium 7 changes the direction of flow from tangential to radial (in relation to the disc-shaped base body 4 of the piston 1). Directly adjacent to this, the flow path 13 runs radially out of the annular piston collar 8 through a recess 11 in the outer wall 9. Exiting from the recess 11 of the outer wall 9, the medium 7 thus flows into the other region 5 of the cylinder 3, which is fluidically connected to a region on the outside of the annular piston collar 8. A reverse flow direction is also conceivable.

To produce the piston 1 according to the method according to claim 1, the surface of the piston 1 is smoothed and/or a flow path 13 is pressed into the piston 1. Both or only one of these steps is carried out by an embossing tool 20, which has a raised and rotationally symmetrical structure 21.

Figure 3A:
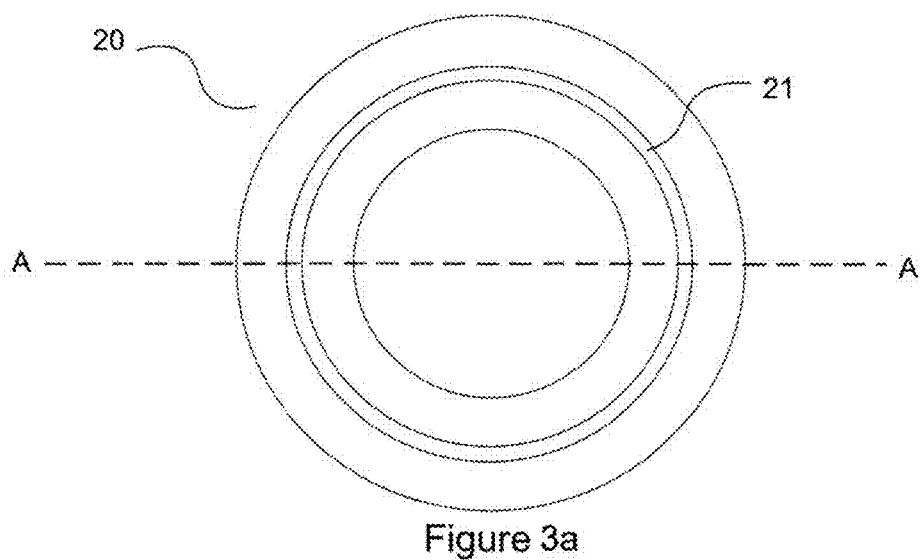
FIG. 3a shows a schematic representation of the embossing tool according to embodiments of the invention in top view.
Figure 3B:
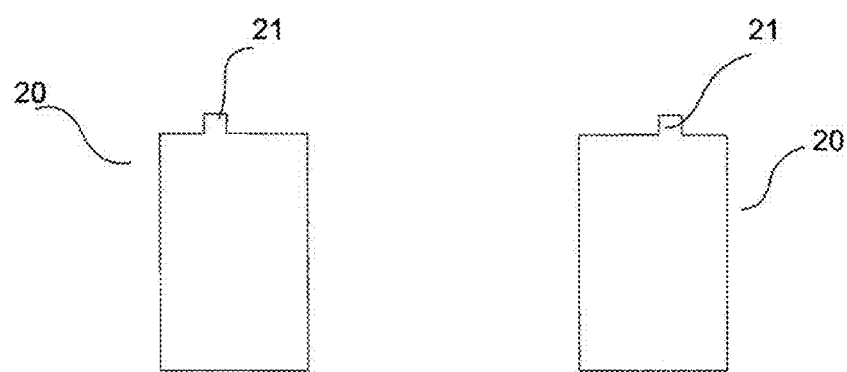
FIG. 3b shows a schematic representation of the embossing tool according to embodiments of the invention as a section along the line A-A (cf.

The embossing tool 20 is shown schematically in FIGS. 3a (top view) and 3b (section along A-A). In the corresponding process step, the surface of the previously deburred piston 1 is smoothed by an embossing tool 20. For this purpose, the embossing tool 20 is pressed flat against the piston 1 with a defined force and/or a defined amount of the surfaces to be smoothed. Furthermore, the embossing tool 20 has a raised rotationally symmetrical structure 21, which is embossed into the piston 1 when the embossing tool 20 is pressed against the piston 1. This results in a negative impression of the raised rotationally symmetrical structure 21 in the piston surface. The piston 1 is pressure-formed with the help of embossing tool 20. However, it is also conceivable that in this process step the surface of the piston 1 is not smoothed by embossing tool 20, but that embossing tool 20 merely embosses the raised rotationally symmetrical structure 21 into the piston 1. It is also conceivable that the embossing tool 20 only smoothes the surface of the piston 1.

In an embodiment, the embossing tool 20 is embodied as a calibration die. The calibration die may be rotationally symmetrically shaped so that it can be precisely reworked on a regular basis to maintain the low production tolerance, for example, in the region from IT 3 to IT 4 (batch variation) and IT 4 to IT 6 (cross-batch variation).

Figure 4:
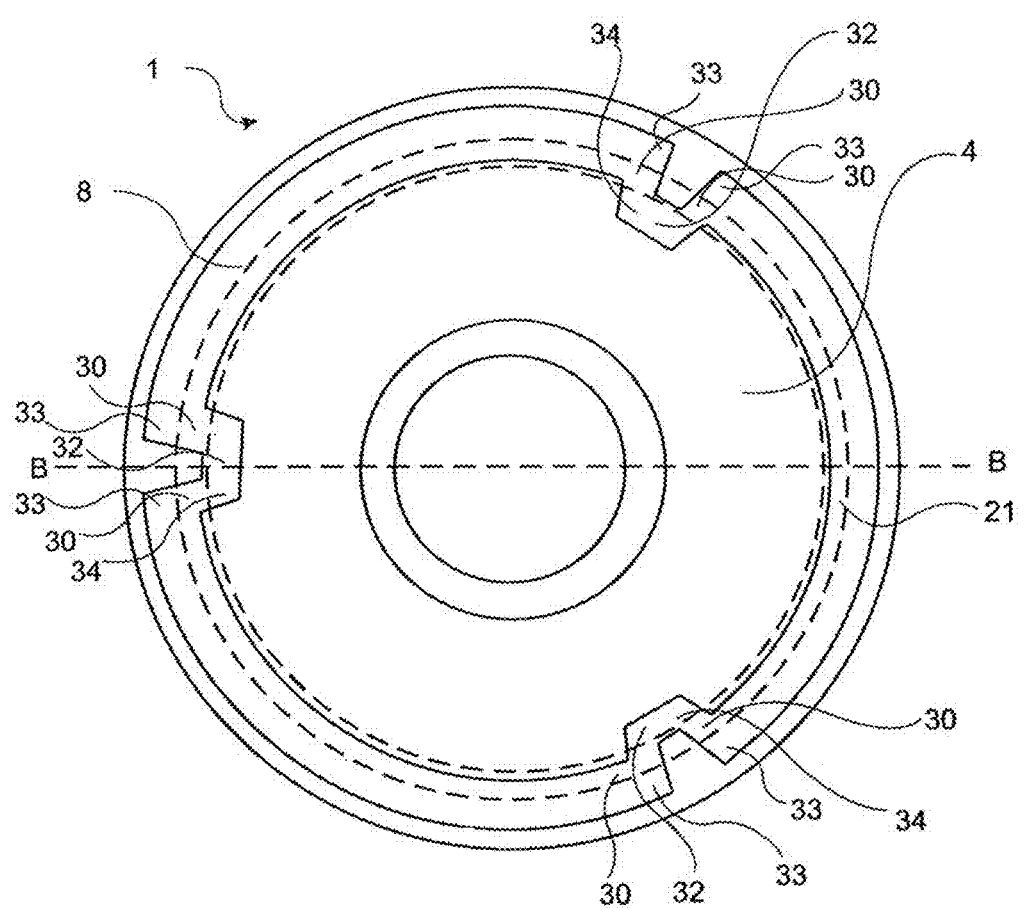
FIG. 4 shows a schematic representation of the piston and the raised rotationally symmetrical structure of the embossing tool according to embodiments of the invention in top view.
Figure 5:
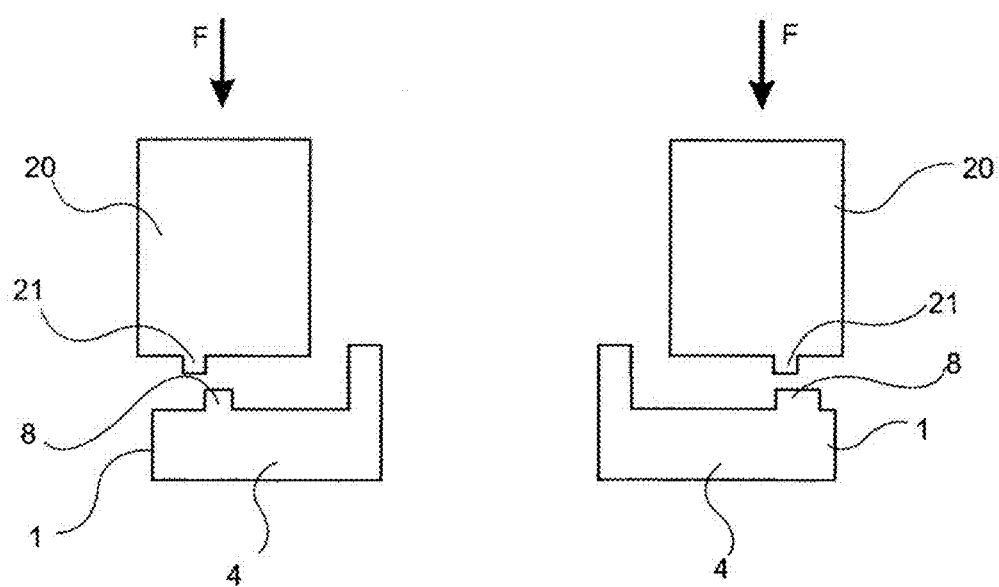
FIG. 5 shows a schematic representation of the piston and the embossing tool according to embodiments of the invention as a section along the line B-B (cf.

The raised, rotationally symmetrical structure 21 of the embossing tool 20 has at least one point of intersection 30 with the ring-shaped piston collar 8, for example, when it is placed on the piston 1, which comprises an annular piston collar 8. When the embossing tool 20 is placed on the piston surface, which is shown schematically in FIGS. 4 and 5 (section along B, FIG. 4), the embossing tool 20 is arranged relative to the piston 1 in such a way that the raised rotationally symmetrical structure 21 of the embossing tool 20 and the annular piston collar 8 of the piston 1 come to rest on one another at at least one point and have at least one point of intersection 30. At the point of intersection 30 the rotationally symmetrical structure 21 of the embossing tool 20 thereby intersects the piston collar 8 from the side of the piston collar 8 facing the piston center to the side of the piston collar 8 facing away from the piston center, or also from the side of the piston collar 8 facing away from the piston center to the side of the piston collar 8 facing the piston center.

The embossing tool 20 is now pressed against piston 1 in the previously described arrangement to the piston 21, or piston 1 is pressed against the embossing tool 20, whereby the contact pressure or amount can be precisely adjusted in both cases. By pressing the raised, rotationally symmetrical structure 21 of the embossing tool 20 into the piston 1 at at least one point of intersection 30 of the raised, rotationally symmetrical structure 21 of the embossing tool 20 with the annular piston collar 8, the annular piston collar 8 may be at least partially pressure-formed into a flattened shape 31. During the pressing-in process, the raised, rotationally symmetrical structure 21 of the embossing tool 20 and the annular piston collar 8 are pressed against each other at at least one point of intersection 30. During this process, the raised rotationally symmetrical structure 21 of the embossing tool 20 presses the annular piston collar 8 at at least the at least one point of intersection 30 into a flattened and/or recessed shape 31, so that the annular piston collar 8 is pressure-formed into a flatter shape at least at this point. The annular piston collar 8 is thus flattened at at least one point by the raised rotationally symmetrical structure 21 of the embossing tool 20. This implies that the height of the piston collar 8, with respect to the direction perpendicular to the plane defined by the disc-shaped base body 4 and parallel to the piston sliding unit 2 (if the piston 1 is arranged on the piston sliding unit 2) is reduced at the flattened point.

Due to this flattening of the annular piston collar 8, the surface of the piston collar 8 is no longer in contact with the sealing counter surface in the region of the flattening when it is arranged on a sealing element 15. At the point of intersection 30, at which the flattening of the piston collar 8 extends from the side of the piston collar 8 facing the piston center to the side of the piston collar 8 facing away from the piston center, the surface of the piston collar 8 thus does not lie at all against the sealing counter surface of the sealing element 15, which creates a flow path 13 for the medium 7 from one of the two regions 6 of the cylinder 3 filled with a medium 7, which are sealed against each other by the piston 1, to the other region 5. This flow path 13 represents the bypass described above, which causes the damper characteristic curve of the damper 100. The reduction in height of the piston collar 8 at at least one flattened area is so great that a bypass is created along the flow path 13 through which the medium 7 can flow.

By producing the bypass with an embossing tool 20, in particular with a calibration die, a reduced production tolerance in the region from IT 3 to IT 4 (batch variation) and IT 4 to IT 6 (cross-batch variation) can be achieved and thus a piston 1 can be produced in industrial series production in accordance with embodiments of the invention.

In an embodiment, the annular piston collar 8 has at least one meander-shaped recess and/or concavity 32, which for example, has at least one section oriented radially 33 and one section oriented tangentially 34 to the piston 1. In the case of a meander-shaped concavity 32, the annular piston collar 8 does not run completely circularly on the surface of the piston 8, but describes at the beginning of the concavity 32 a first curve in the direction of the center of the piston surface on which the piston collar 8 is arranged with an adjoining straight section and thus has a piston collar section 33, which is arranged radially in relation to the disc-shaped base body 4 of the piston 1. In the further course of the concavity 32, the piston collar 8 has a second curve in the opposite direction, also with an adjoining straight section and thus has a piston collar section 34, which is arranged tangentially with respect to the disc-shaped base body 4 of the piston 1. The piston collar 8 then has a third curve in the same direction as the second curve, which is also followed by a straight section. The concavity 32 thus has a second piston collar section 33, which is arranged radially in relation to the disc-shaped base body 4 of the piston 1. This second radial section 33 is followed by a fourth curve, which runs in the same direction as the first curve, so that the piston collar 8 now continues along the circular basic shape. In the case of a convexity, the piston collar is shaped similarly to this description, with the difference that the curves lead in the opposite direction and that the first radial section 33 of the piston collar leads away from the center of the piston surface on which the piston collar 8 is located. It is also conceivable that the piston collar 8 has corners in the region of the concavity 32 or convexity instead of curves.

In an embodiment, the concavity 32 or convexity described above has an angular "U" shape with or without rounded corners. However, other shapes of concavities 32 or convexities are conceivable, for example a "V" shape or a semi-circular shape, or any other shape known to the expert with which the raised rotationally symmetrical structure 21 of the embossing tool 20 crosses the piston collar 8 at at least one point.

In an embodiment, at least one point of intersection 30 of the rotationally symmetrical structure 21 of the embossing tool 20 is located within at least one meander-shaped concavity 32 or convexity of the annular piston collar 8. Furthermore, in an embodiment, at least one point of intersection 30 of the rotationally symmetrical structure 21 of the embossing tool 20 is arranged in the at least one section 33 of the at least one meander-shaped concavity 32 or convexity of the annular piston collar 8, which is aligned radially to the piston 1. The meander-shaped concavities 32 may have right-angled corners, which can be rounded. The raised rotationally symmetrical structure 21 of the embossing tool 20 is, for example, ring-shaped. It is particularly advantageous if the ring diameter of the raised rotationally symmetrical structure 21 is smaller than the ring diameter of the piston collar 8 without including the meander-shaped concavities 32, but larger than the ring diameter of an imaginary ring along the tangentially running sections 34 of the concavities 32 of the piston collar 8. As a result, there are two points of intersection 30 of the raised rotationally symmetrical structure 21 of the embossing tool 20 and the piston collar 8 at each concavity 32, each in the radially arranged sections 33 of the piston collar 8 of an concavity 32. It is particularly advantageous here if the ring diameter of the raised rotationally symmetrical structure 21 of the embossing tool 20 is smaller than the ring diameter of the piston collar 8, but still large enough for the raised rotationally symmetrical structure 21 of the embossing tool 20 to be located on its outside, relative to the ring center, along the entire ring circumference but outside the concavities 32, with a portion of the ring width resting on a portion of the ring width on the inside, relative to the ring center, of the piston collar 8 and also pressure forming it into a flatter shape (see FIG. 5 right).

In case of meander-shaped convexities of the piston collar 8, the ring diameter of the raised rotationally symmetrical structure 21 is advantageously larger than the ring diameter of the piston collar 8 without including the meander-shaped convexities, but smaller than the ring diameter of an imaginary ring along the tangentially running sections 34 of the convexities of the piston collar 8. As a result, there are also two points of intersection 30 of the raised rotationally symmetrical structure 21 of the embossing tool 20 and the piston collar 8 at each convexity, each in the radially arranged sections 33 of the piston collar 8 of a convexity.

Although the invention has been illustrated and described in greater detail with reference to exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCE SIGNS 1 piston
2 piston sliding unit
3 cylinder
4 disc-shaped base body
5 a region of the cylinder
6 another region of the cylinder
7 medium
8 piston collar
9 outer wall
10 inner wall
11 recess in the outer wall
12 recess in the inner wall
13 flow path
14 curved region of the flow path
15 sealing element
20 embossing tool
21 raised rotationally symmetrical structure
30 point of intersection
31 flattened shape of the piston collar
32 piston collar convexity or concavity
33 radially running section of the piston collar
34 tangential section of the piston collar

The invention claimed is:

1. A method for producing a piston, wherein the piston is attachable to a piston sliding unit, wherein the piston sliding unit is movable along its longitudinal axis in a cylinder, wherein the piston has a disc-shaped base body, wherein the piston is suitable and intended to seal two regions of the cylinder filled with a medium against each other, and wherein the piston comprises an annular piston collar,
the method comprising the steps:
 a. producing the piston by pressing a material into a piston mold;
 b. pressing at least one flow path into the piston by an embossing tool which has a raised and rotationally symmetrical structure,
 wherein the raised and rotationally symmetrical structure of the embossing tool has at least one point of intersection with the annular piston collar when placed on the piston,
 wherein the raised and rotationally symmetrical structure of the embossing tool crosses the annular piston collar from a side facing a piston center to a side facing away from the annular piston center at the at least one point of intersection, and
 wherein the annular piston collar is at least partially pressure-formed into a flattened and/or recessed shape by pressing the raised and rotationally symmetrical structure into the piston at the at least one point of intersection.

2. The method according to claim 1, wherein the annular piston collar has at least one meander-shaped convexity and/or concavity, which has at least one section oriented radially and one section oriented tangentially to the piston.

3. The method according to claim 2, wherein at least one point of intersection of the rotationally symmetrical structure of the embossing tool is arranged within the at least one meander-shaped convexity or concavity of the annular piston collar.

4. The method according to claim 2, wherein at least one point of intersection of the raised rotationally symmetrical structure of the embossing tool is arranged in the at least one section oriented radially to the piston of the at least one meander-shaped convexity or concavity of the annular piston collar.

* * * * *